June 30, 1970  W. KNAPP  3,517,778
DISC BRAKES AND FRICTION PAD MOUNTING THEREFOR
Filed July 3, 1968  3 Sheets-Sheet 1

United States Patent Office 3,517,778
Patented June 30, 1970

3,517,778
DISC BRAKES AND FRICTION PAD MOUNTING THEREFOR
Wilhelm Knapp, Bad Homburg, Germany, assignor to The Dunlop Company Limited, London, England, a corporation of Great Britain
Filed July 3, 1968, Ser. No. 742,256
Int. Cl. F16d 55/224
U.S. Cl. 188—73.3  12 Claims

ABSTRACT OF THE DISCLOSURE

A disc brake in which the friction elements are mounted on friction element carriers that are disposed on guide pins supported by pivotally mounted link members so that during braking the braking heat will not affect the free sliding movement of the brake carriers which could otherwise cause the braking parts to jam and adversely affect application and release of the brakes.

---

Figure 1:
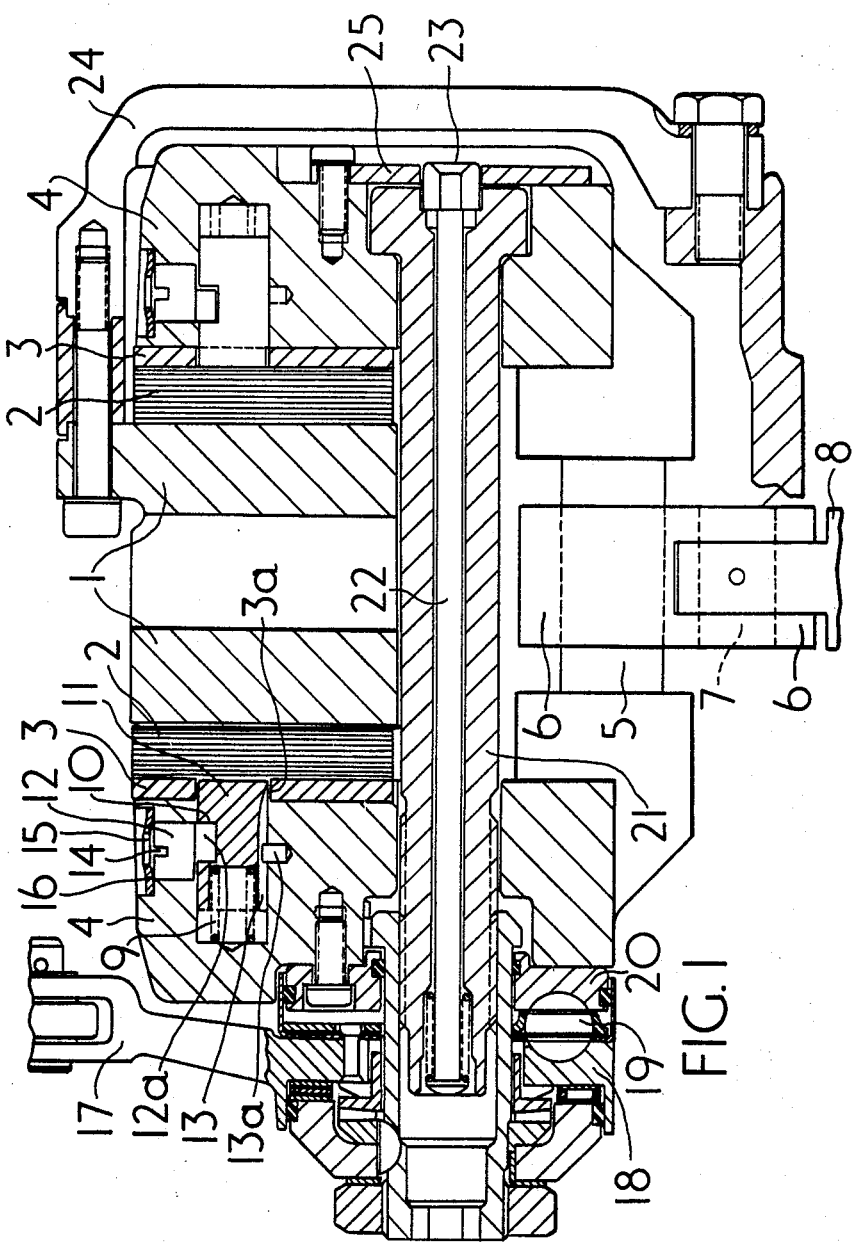

This invention relates to disc brakes for motor vehicles.

In a disc brake of the kind in which an annular disc is attached at its outer periphery to a rotatable housing or spider the friction elements, each comprising a friction pad and a backing plate, are attached to friction element carriers. The carriers may be mounted so that they can slide in an axial direction, relative to the brake disc, on fixed guide pins which fit within guide bores in the carriers.

In disc brakes of this kind it is desirable that there should be a reasonably close sliding fit of the guide pins in the guide bores to prevent excessive play due to shocks or vibrations during operation. At the same time the sliding movement should be sufficiently easy to facilitate application and release of the brakes. However, it can occur in disc brakes of this kind that temperature differences caused by the heat developed during braking tend to give rise to differences between the separation of the guide pins and the separation of the guide bores which may cause these parts to jam.

In this kind of disc brake the device for locking a friction element to its friction element carrier is often positioned between the brake and the rotating housing, but this is undesirable since it makes it necessary either to increase the overall dimensions of the brake or to reduce the effective diameter of the brake disc.

One object of the present invention is to provide means for guiding the axial movement, relative to an associated brake disc, of a friction element carrier in a disc brake.

A further object of the invention is to provide a secure but easily releasable means for locking a friction element to a friction element carrier in a disc brake.

According to one aspect of the invention a disc brake has a pair of friction elements mounted on friction element carriers slidable in an axial direction, relative to an associated brake disc, to enable the friction elements to be moved into contact with opposite faces of the brake disc, one guide pin being supported by a link member attached pivotally to a non-movable component of the brake.

A disc brake according to the invention may be provided with a locking device, for locking a friction element to a friction element carrier, comprising a locking pin engageable with the friction element and mounted so as to be freely slidable in the axial direction in a recess in the friction element carrier, and being spring-loaded to resist movement of the locking pin in a direction axially away from the friction element.

In a disc brake according to the invention each locking pin may have a transverse groove for engagement by a rotatably mounted eccentric pin, the eccentric pin having an eccentric arm which engages the groove to provide means for withdrawing the locking pin axially away from the friction element, the locking pin being prevented from rotating by a suitable device, from example a groove and key device or a groove and pin device.

The eccentric pin may be provided with a recess in its head in the form of, for example, a slot, a crossed slot or a polygonal recess and may be prevented from moving in a direction perpendicular to the axis of the locking pin by means of a locking disc provided with a central hole.

According to a still further aspect of the invention the brake pad may be guided between two lateral guide strips and a radial mechanical stop.

One embodiment of the invention will now be described with reference to the dawings.

Figure 2:
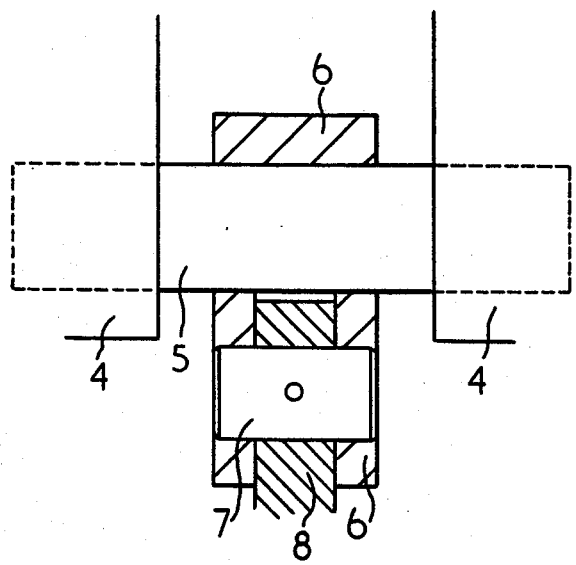
Figure 3:
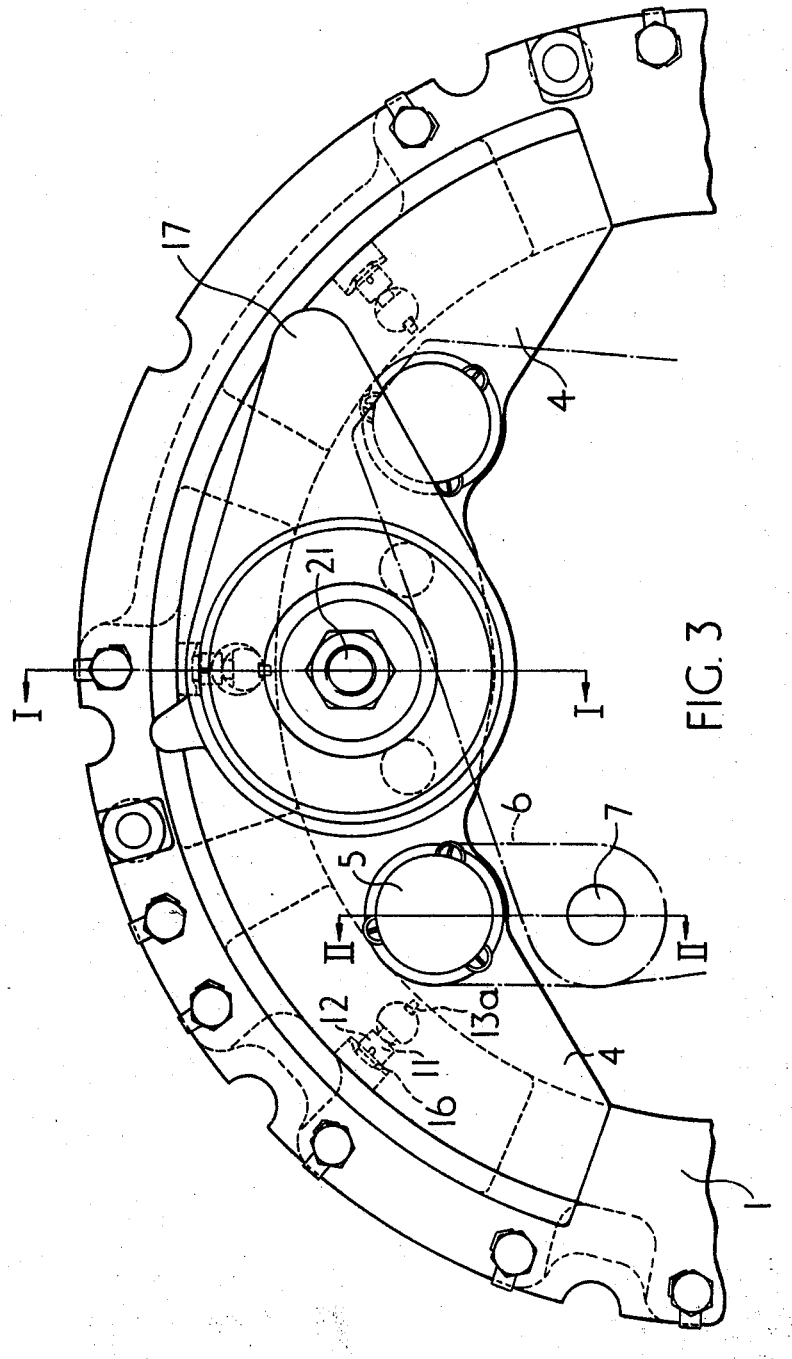

FIG. 1 is a section through a disc brake, according to the invention, taken on the line I—I of FIG. 3;
FIG. 2 is a part-section on the line II—II of FIG. 3;
FIG. 3 is an end view of the brake in the axial direction.

The disc brake shown in the drawings comprises an annular disc 1 attached at its outer periphery to a rotatable housing 24, a pair of friction pads 2 with their backing plates 3 and friction element carriers 4. The friction element carriers 4 are capable of sliding in an axial direction with respect to the disc 1 on guide pins 5 which fit within guide bores in the carriers 4.

The brake is operated by movement of the lever 17 through a conventional ball and ramp assembly 18, 19 and 20, separation of the two ramp parts 18, 20 causing movement of the two friciton element carriers 4 in a brake-applying direction. The brake-applying force is transmitted to the right-hand friction element carrier, as shown in FIG. 1, through a tie-bolt 21. This tie-bolt is locked against rotation by means of a spring-loaded pin 22 passing coaxially through a bore formed in the tie-bolt 21 and having a hexagonal head 23 engaging hexagonal recesses in the tie-bolt 21 and a plate 25 secured to the right-hand friction element carrier 4.

A link member 6 is fitted over one of the guide pins 5 to act as a support for this guide pin. The link member 6 is arranged to lie substantially perpendicular to the axis of this guide pin 5 and is mounted so as to lie free to pivot about a pin 7 which is attached to a non-movable component of the brake 8.

Each friction pad 2 is locked to its friction element carrier 4 by means of a locking pin 11 which engages a recess 3a in the backing plate 3 and the locking pin is free to slide in an axial direction against the influence of a spring 9.

Each locking pin 11 is provided with a transverse groove 10 into which fits the eccentric arm 12a of a rotatably mounted eccentric pin 12. This eccentric pin 12 has a slot 14 in its head and is prevented from moving in a direction perpendicular to the axis of the locking pin by means of a locking disc 16 which is provided with an access opening 15.

Each locking pin 11 is prevented from rotating by means of a longitudinal groove 13 in the locking pin and a pin or key 13a attached to the body of the friction element carrier 4 which is arranged to engage the groove 13 in the locking pin 11.

The friction element 2, 3 is guided (not shown) between two lateral guide strips and a radial stop.

When the brakes are applied heat is developed in the brake mechanism, and the distance between the guide pin 5 bores in the friction element carriers 4 tends to increase. The link member 6 is however free to pivot about the pin 7 to allow the pin 5 to readjust its position.

In this way jamming of the carriers on the pins is prevented in spite of the provision of a close sliding fit between the guide pins 5 and the corresponding bores for the pins, resulting in an easy axial sliding movement of the friction element carriers during application and release of the brakes which would not otherwise occur if there were no such provision for self-adjustment movement of the pins.

To remove a friction pad the eccentric pin 12 is first of all rotated, for example by means of a screw driver inserted through the opening 15 into the slot 14. The eccentric arm 12a bears against one side of the transverse groove 10 of the locking pin 11 and moves the locking pin in an axial direction. Rotation through 180° of the eccentric pin 12 brings the locking pin 11, against the influence of the spring 9, out of the recess 3a in the backing plate, so that the friction pad 2 can be removed from the brake together with its backing plate 3. After a replacement friction pad has been fitted and the friction element replaced it is merely necessary to rotate the eccentric pin 12 back again through a small angle whereupon the locking pin 11, under the influence of the spring 9, returns into its locking position, the eccentric pin 12 at the same time automatically rotating back again.

In a disc brake as described above, one guide pin for a friction element carrier is provided with a link support which is mounted rotatably on a non-movable component of the brake and consequently movement of this guide pin can take place to compensate for any change in the separation of the guide drillings in the friction element carrier during braking due to temperature differences which are caused by the heat generated during braking.

In addition, in a disc brake as described above the friction elements are locked to their carriers by a constructionally simple and easily released locking device which is contained within the body of the carrier and consequently does not place any limitations on the size of the brake and which is entirely self-locking and therefore is unlikely to work loose under the influence of disturbing forces.

Having now described my invention, what I claim is:

1. A disc brake having a pair of friction elements one disposed on each side of a rotatable member and adapted to be engaged therewith, a relatively fixed torque taking member, friction element carriers for said friction elements which are mounted for sliding movement in an axial direction to effect forcible application of the friction elements against the opposed relatively rotatable member, two circumferentially spaced guide pins each providing an axial sliding mounting for said friction element carriers, one guide pin being relatively fixed and the other guide pin being angularly movable so that said pins are movable relatively to each other in a plane parallel to the plane of said friction elements, the angularly movable one of said pins having a link and means for pivotally mounting said link on to said torque taking member, each of said pins providing bearing surfaces which define and limit the relative movement of said friction elements to axial sliding movements transversely to the opposed surface of the rotatable member.

2. A disc brake according to claim 1 in which the link member is pivotally mounted on a second pin attached to a non-movable component of the brake.

3. A disc brake according to claim 1 having a tie-bolt attached to one friction element carrier arranged to transmit a brake-applying force to the carrier, said tie-bolt being locked against rotation by means of a spring-loaded pin passing coaxially through a bore formed in the tie-bolt and having a polygonal head engaging similarly shaped recesses in the tie-bolt and the friction element carrier.

4. A disc brake according to claim 1 operated by means of a lever through a ball and ramp assembly arranged so that separation of the two ramp parts causes the two friction element carriers to move in a brake-applying direction, one of said ramp parts being attached to its associated carrier by means of a tie-bolt, this tie-bolt transmitting the brake-applying force to the carrier.

5. A disc brake according to claim 1 having a locking device, for locking a friction element to a friction element carrier, comprising a locking pin engageable with the friction element and mounted so as to be freely slidable in the axial direction in a recess in the friction element carrier, and being spring-loaded to resist movement of the locking pin in a direction axially away from the friction element.

6. A disc brake according to claim 5 in which the locking pin engages a recess in the friction element.

7. A disc brake according to claim 5 having a locking pin provided with a transverse groove and a rotatably mounted eccentric pin formed with an eccentric arm, the eccentric arm fitting within the transverse groove in such a manner that the locking pin can be moved in an axial direction, relative to an associated brake disc, by rotation of the eccentric pin.

8. A disc brake according to claim 7 in which the locking pin is keyed to its associated friction element carrier by means of a pin attached to said carrier engageable with a longitudinal groove formed in the locking pin in such a manner as to prevent rotational movement of the locking pin.

9. A disc brake according to claim 7 in which the eccentric pin is locked against movement in a direction perpendicular to the axis of the locking pin by means of a disc pressing on the head of the pin, said disc being provided with a central hole and the head of said pin being provided with a recess such that a suitable tool can be inserted through the hole in the disc to engage the recess in the head of the pin for rotation of the pin.

10. A disc brake according to claim 9 in which the recess in the head of the eccentric pin is in the form of a slot.

11. A disc brake according to claim 9 in which the recess in the head of the eccentric pin is in the form of a crossed slot.

12. A disc brake according to claim 9 in which the recess in the head of the eccentric pin is in the form of a polygonal recess.

References Cited

UNITED STATES PATENTS

| 2,655,229 | 10/1953 | Eksergian | 188—73 X |
| 2,784,811 | 3/1957 | Butler | 188—73 |
| 3,392,806 | 7/1968 | Knapp. | |

FOREIGN PATENTS

| 1,477,023 | 3/1967 | France. |

GEORGE E. A. HALVOSA, Primary Examiner